(12) United States Patent
Chen et al.

(10) Patent No.: US 9,342,390 B2
(45) Date of Patent: May 17, 2016

(54) CLUSTER MANAGEMENT IN A SHARED NOTHING CLUSTER

(71) Applicant: INTERNATIONAL BUSINESS MACHINES CORPORATION, Armonk, NY (US)

(72) Inventors: Qi Chen, Hayward, CA (US); Dikran S. Meliksetian, Danbury, CT (US); Liping Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 14/161,883

(22) Filed: Jan. 23, 2014

(65) Prior Publication Data

US 2014/0215258 A1 Jul. 31, 2014

(30) Foreign Application Priority Data

Jan. 31, 2013 (CN) .......................... 2013 1 0036718

(51) Int. Cl.
*G06F 11/00* (2006.01)
*G06F 11/07* (2006.01)

(52) U.S. Cl.
CPC ........ *G06F 11/0709* (2013.01); *G06F 11/0793* (2013.01)

(58) Field of Classification Search
CPC .................................................. G06F 11/0709
USPC ............................................. 714/4.3, 4.4, 4.5
See application file for complete search history.

(56) References Cited

U.S. PATENT DOCUMENTS

| 7,287,186 | B2 * | 10/2007 | McCrory et al. ................. 714/13 |
| 8,032,488 | B2 | 10/2011 | Lashley et al. |
| 8,112,593 | B2 | 2/2012 | Pandey |
| 2005/0283658 | A1 | 12/2005 | Clark et al. |
| 2006/0259525 | A1 * | 11/2006 | Bae et al. ...................... 707/202 |

OTHER PUBLICATIONS

F. Dinu et al., "Understanding the Effects and Implications of Compute Node Related Failures in Hadoop", ACM, Proceedings of the 21st International Symposium on High-Performace Parallel and Distributed Computing, Jun. 2012, pp. 187-198.
F. Dinu et al., "Analysis of Hadoop's Performance Under Failures", Rice University Technical Report, TR11-05, Nov. 2011, pp. 1-10.

* cited by examiner

*Primary Examiner* — Dieu-Minh Le
(74) *Attorney, Agent, or Firm* — Law Office of Jim Boice

(57) ABSTRACT

A method, system, and/or computer program product provides cluster management for a shared nothing cluster, wherein the shared nothing cluster comprises one or more data nodes each having an operating system and applications running thereon, and wherein the data nodes in the shared nothing cluster do not share data storage devices. One or more processors collects cluster configuration information associated with the data nodes. A tabulation image is obtained based on the collected cluster configuration information. In response to determining that operating system breakdowns occurred on one or more of the data nodes, the obtained tabulation image is sent to faulted data nodes to enable the recovery of their operating systems.

20 Claims, 8 Drawing Sheets

CLUSTER MANAGEMENT IN A SHARED NOTHING CLUSTER

This application is based on and claims the benefit of priority from China (CN) Patent Application 201310036718.1, filed on Jan. 31, 2013, and herein incorporated by reference in its entirety.

BACKGROUND

The present invention in general relates to the field of shared nothing clusters, and more specifically, to a cluster management method and device for recovering faulted data nodes in a shared nothing cluster.

Recently, shared nothing clusters, such as Hadoop, have attracted wide attention and gained a rapid development due to their reliability and high efficiency in distributed big data processing. A shared nothing cluster usually comprises a considerable amount of machines and disks for mass data storage, where none of the machines (i.e., nodes) share memory and/or storage. In order to achieve the maximum business value, it is a priority in big data management to ensure the reliability of cluster data, the scalability of the cluster, and cluster management efficiency.

FIG. 7a shows the architecture of a typical existing shared nothing cluster. In general, one or more machines in a shared nothing cluster are designated as masters, for example, the master nodes 710 in FIG. 7a, and the rest machines in the cluster may be designated as slave nodes or data nodes, such as data nodes 720 in FIG. 7a. In general, each mater node is used to superintend one or more data nodes; at least some of those data nodes have operating systems (OS) and applications running thereon, wherein the applications generally comprise cluster applications and/or local applications. As shown in FIG. 7b, generally, a data node further comprises local data files, cluster data replicas, and application files.

However, the existing shared nothing cluster architecture suffers from some potential issues that may injure cluster reliability. For example, when the OS on a data node in the cluster has broken down, applications and local/cluster data on that data node cannot be directly accessed any more.

Although some shared nothing file system (for example, Hadoop distributed file system (HDFS)) can ensure the reliability of cluster data through adopting cluster data replicas stored on other data nodes, recovering the OS and applications on a faulted data node cannot be achieved through cluster performances. That is, at present, automatic restart and failover are not supported for the OS, local data files and local/cluster applications on a data node in the cluster.

More seriously, if all data nodes storing part of cluster data happen to be broken, prompt access to not only the OS, local data files, local and cluster applications on each of these data nodes, but also the cluster data commonly stored thereon cannot be realized for cluster users.

In order to recover a data node with a broken-down OS, a user has to:

(i) replicate cluster data stored on the faulted data node on another data node in the cluster;

(ii) remove the faulted data nodes (if there are several faulted data nodes) from the cluster manually one by one;

(iii) format some previous data and reinstall an OS on the faulted data node;

(iv) reconfigure several applications on the faulted data node;

(v) deploy the faulted data node as a new data node and manually add the new node to the operating shared nothing cluster; and (vi) as required, rebalance data over the cluster when unbalance occurs in the data node newly added to the cluster.

In the above operations (i) to (vi), data in the data node cannot be directly accessed any more, and running application may be lost. The backup of a mass of previous data in operation (i) and formatting data and OS installation in operation (iii) may take a considerable long period of time. Removing/adding nodes from/to the cluster need to interrupt running cluster applications.

Moreover, adding a new data node to the cluster usually causes cluster unbalance, and requires rebalancing data in the new cluster, which may impact cluster performance. If the cluster has a larger number of data nodes, for example, 100 nodes, even if the OS on only one node has broken down, rebalancing the complete cluster and recovering all nodes in the original cluster takes about 10 days. With the growth in scale of the cluster, the above fault recovery process may take an even longer period of time, leading to an expansive cost.

Thus, a cluster management method and device capable of recovering a faulted data node in a shared nothing cluster rapidly and conveniently are desired.

Furthermore, a cluster management method and device capable of recovering a plurality of faulted data nodes in a shared nothing cluster simultaneously are desired.

SUMMARY

A method, system, and/or computer program product provides cluster management for a shared nothing cluster, wherein the shared nothing cluster comprises one or more data nodes each having an operating system and applications running thereon, and wherein the data nodes in the shared nothing cluster do not share data storage devices. One or more processors collects cluster configuration information associated with the data nodes. A tabulation image is obtained based on the collected cluster configuration information. In response to determining that operating system breakdowns occurred on one or more of the data nodes, the obtained tabulation image is sent to faulted data nodes to enable the recovery of their operating systems.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
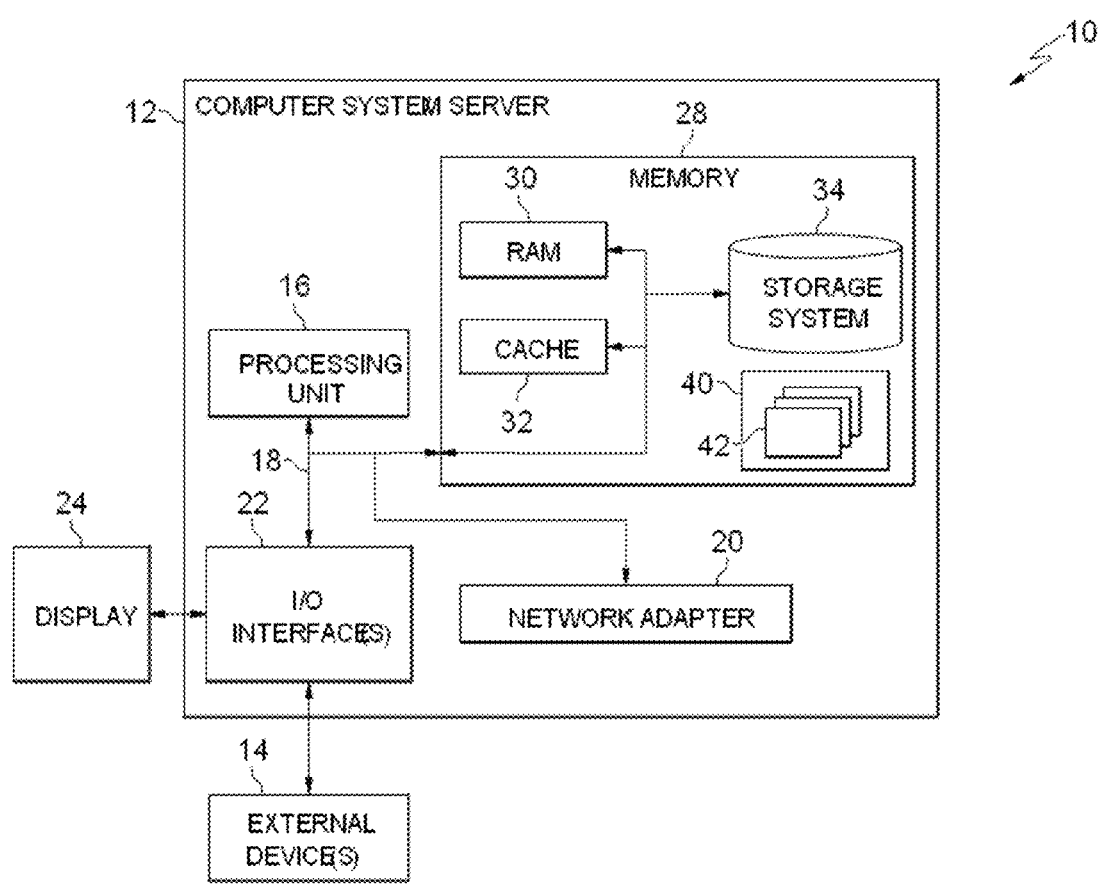
FIG. 1 shows an exemplary computer system 100 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As described above, the cluster management method and device dynamically collect cluster configuration information, and obtain a tabulation image containing a minimal operative OS and minimal operative applications according to the collected cluster configuration information, then in response to determining an OS breakdown on one or more data nodes in the cluster, send the obtained tabulation image to the faulted data nodes to rapidly recover its OS and applications.

Figure 2:
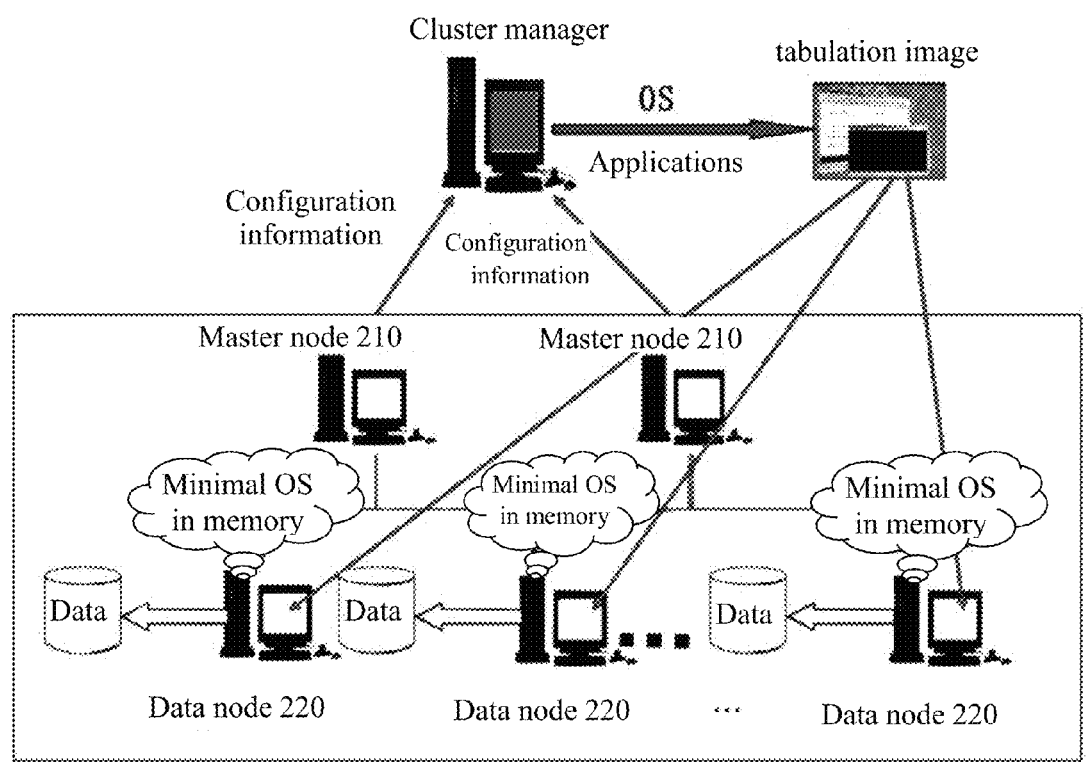
FIG. 2 illustrates an architecture of a shared nothing cluster according to an embodiment of this invention, comprising a cluster manager.

Hereinafter, embodiments of this invention will be particularly described with reference to FIG. 2 to FIG. 6. FIG. 2 illustrates the architecture of a shared nothing cluster according to an embodiment of this invention. As compared with the architecture of a shared nothing cluster in the prior art, in addition to a master node 210 and data nodes 220, there is further a cluster manager 230. The main node 210 may superintend one or more data nodes 220, each having an OS and applications running thereon. The cluster manager 230 is configured to handle OS or application faults on the data nodes 220 according to configuration information about the data nodes 220 collected by the master node 210 in the cluster.

Figure 3:
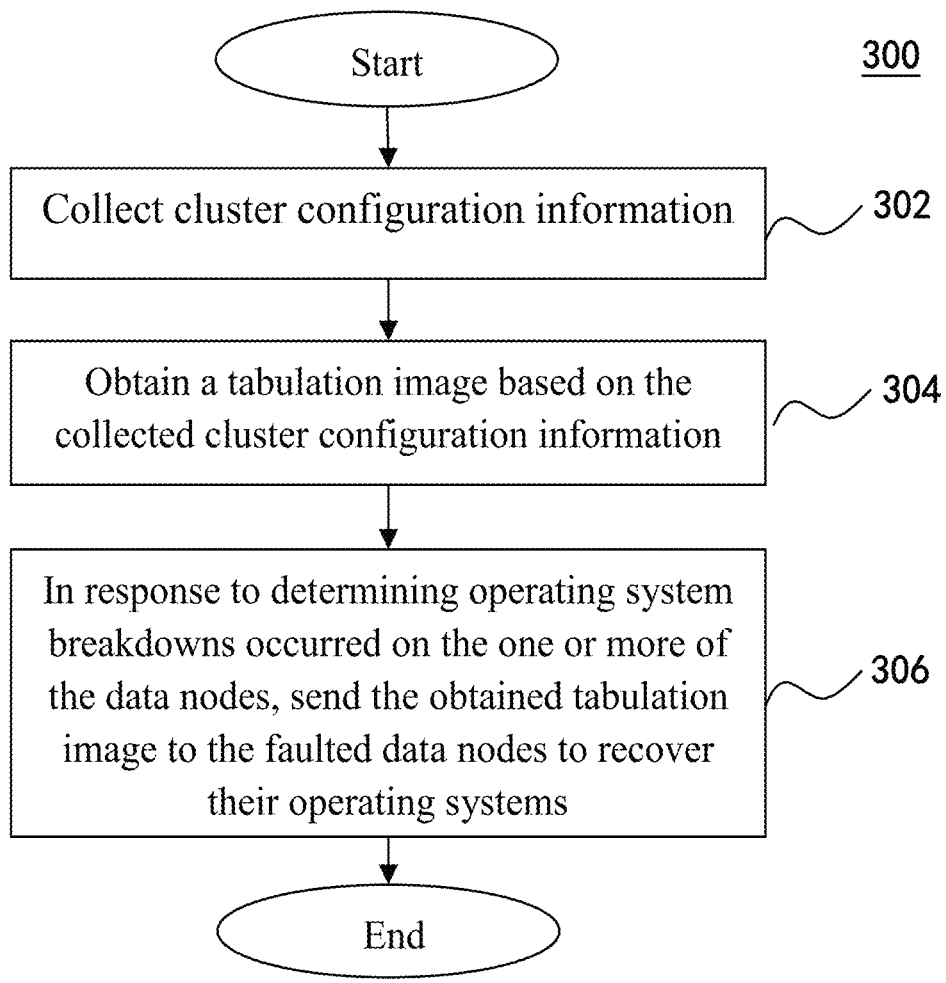
FIG. 3 is a general flowchart of a cluster management method performed by the cluster manager in FIG. 2 according to an embodiment of this invention.

FIG. 3 is a general flowchart of a cluster management method 300 performed by the cluster manager in FIG. 2 according to an embodiment of this invention. First of all, at step 302, cluster configuration information associated with data nodes 220 is collected.

In an embodiment, the cluster configuration information may comprise information associated with the OS running on the data node 220. In another embodiment, the cluster configuration information may further comprise information about applications running on the data node 220, comprising cluster applications and local applications.

In an embodiment, the cluster manager 230 may obtain, from the master node 210, cluster configuration information of data nodes 220 superintended by the master node 210, for example, interactively varied cluster matrix configuration and actions.

Next, at step 304, a tabulation image is obtained based on the collected cluster configuration information of data nodes. In an embodiment, the tabulation image may comprise a minimal operative OS of the data node, such as an OS kernel. In another embodiment, the tabulation image may further comprise minimal operative applications of the data node, including minimal operative cluster and/or local applications.

In an embodiment, the cluster manager 230 may dynamically collect cluster matrix configuration of data nodes, optimize and refine the minimal operative OS and applications to generate the tabulation image of the data node. Recovery can be realized through utilizing the tabulation image containing the minimal operative OS, so that the complexity of OS components can be reduced, and the recovery process can be accelerated.

Note that the collection of cluster configuration information can be performed by the cluster manager 230 periodically or in real time. Thus, the cluster manager may always maintain an up-to-date tabulation image. For example, when there is an update in cluster matrix configuration, a newest tabulation image is generated.

Figure 4:
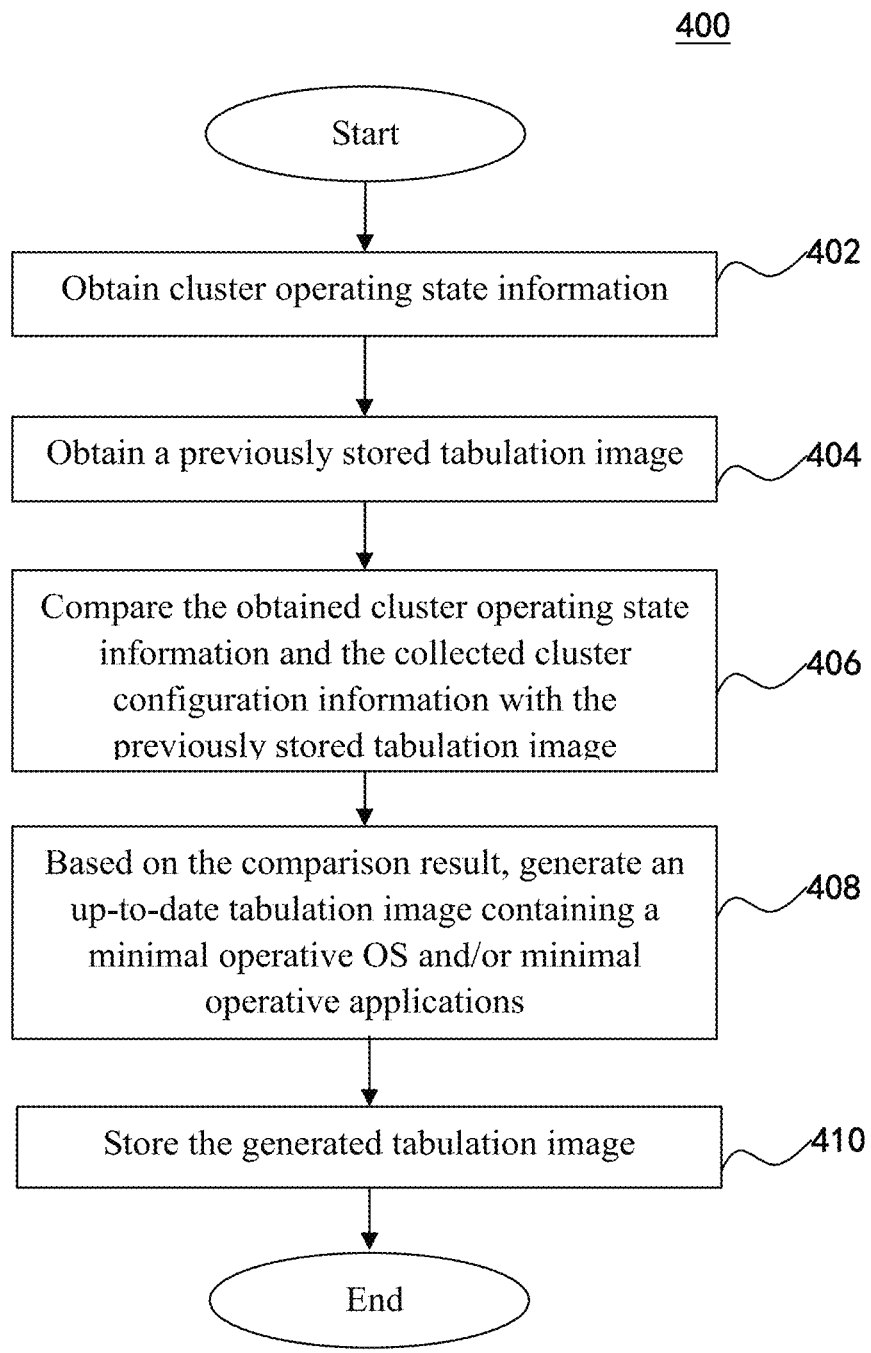
FIG. 4 illustrates a particular process of obtaining a tabulation image.

FIG. 4 particularly illustrates a specific process 400 of step 304. The process 400 may begin at step 402. At step 402, cluster operating state information of a shared nothing cluster is obtained. The cluster operating state information may comprise, for example, cluster file system configuration properties and data storage state information, cluster distributed computing job progress configuration properties and running application state information, etc. In an embodiment, the cluster operating state information may further comprise cluster node information, such as information indicating the master node and date nodes. In this situation, the step of obtaining cluster operating state information may be executed before the step 302 of collecting cluster configuration information associated with data nodes in the method 300.

Next, a tabulation image is generated using the obtained cluster operating state information and the cluster configuration information collected at step 302. At step 404, a previously stored tabulation image can be obtained. Then, the obtained cluster operating state information and the collected cluster configuration information are compared with the previously stored tabulation image (step 406), for example, to compare their appearances and behaviors to find inconsistencies. If there are inconsistencies found, based on the comparison result about inconsistency, an up-to-date tabulation image containing a minimal operative OS and/or minimal operative applications is generated (step 408). For example, a newest tabulation image is generated through aggregating the cluster operating state information and cluster configuration information. At last, the generated tabulation image is stored at step 410.

Returning to the cluster management method 300 of FIG. 3, after obtaining the tabulation image, at step 306, it is determined at first whether an OS failure occurs on a data node. If so, the tabulation image obtained at step 304 is sent to the faulted data node to recover its OS, and optionally to recover applications running thereon.

In an embodiment, in response to determining OS breakdowns occurred on multiple data node at step 306, the minimal operative OS of the tabulation image can be installed in parallel on those multiple data nodes, and optionally the minimal operative applications of the tabulation image are installed in parallel further. In an embodiment, the installation of the OS and/or applications can be performed in the memory of those data nodes, instead of direct-attached disks, which can make the recovery process more convenient.

Note that more than one tabulation image can be stored in the cluster manager 230. For example, the data nodes in the shared nothing cluster can be divided into one or more date node groups according to their functions. Provided that all data nodes in the same data group have the same OS and applications running thereon, and data nodes in different data node groups have different OSs and applications, steps 302 and 304 of FIG. 3 can be executed for each data node group, respectively. That is, for each data node group, based on cluster configuration information collected from the data nodes of that group, a tabulation image is obtained for that group. Before the execution of step 306, a data node group which a data node with a broken OS belongs to is determined at first, and then a tabulation image corresponding to the data node group that is stored in the cluster manager 230 is sent to the broken data node.

Figure 5:
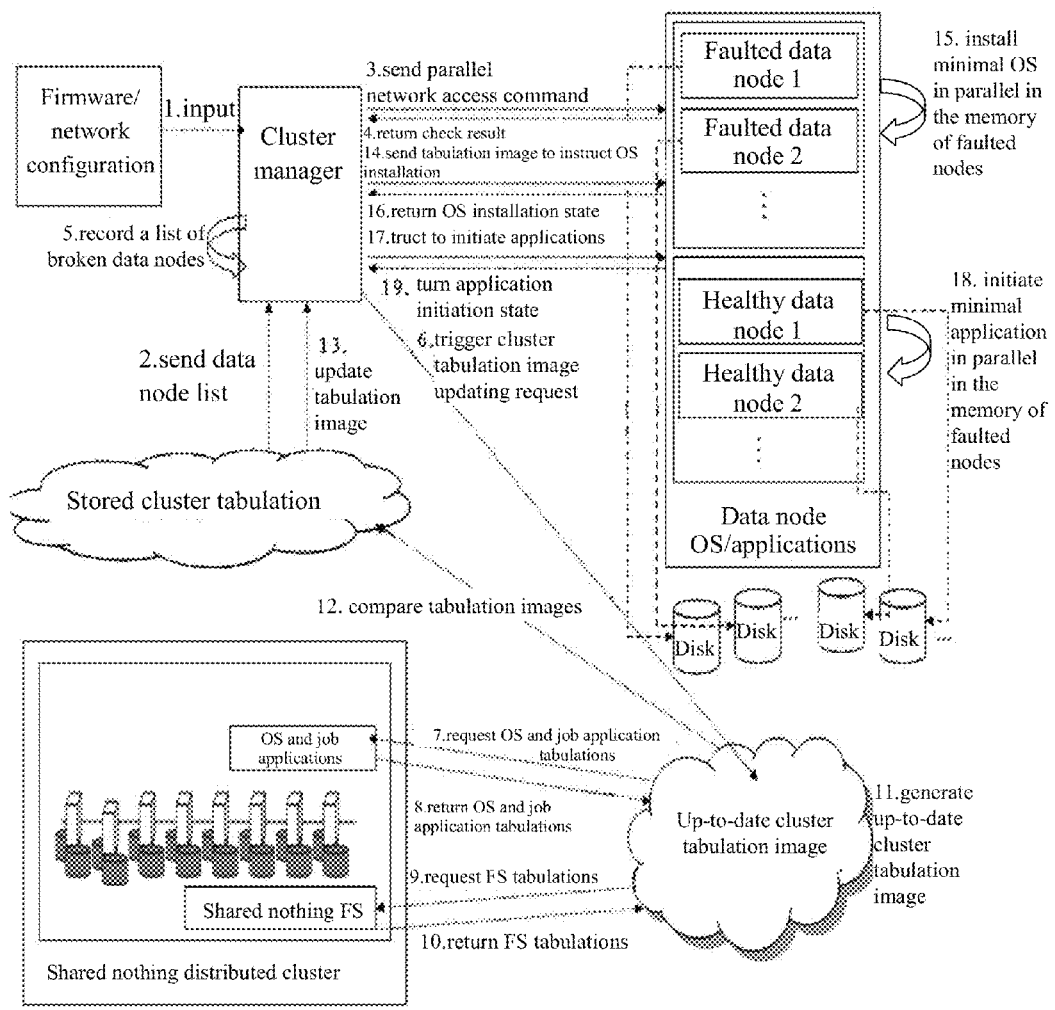
FIG. 5 schematically shows an operative example of the cluster manager according to an embodiment of this invention.

FIG. 5 schematically shows an operative example of the cluster manager of FIG. 2. First of all, firmware/network configuration information of a shared nothing cluster is inputted into the cluster manager, so that the cluster manager has information about all cluster nodes. Then, a list of cluster data nodes is obtained from a current tabulation image on the cluster manager. The cluster manager periodically sends a parallel network access command to the data nodes in the data node list, to examine whether those data nodes operate normally or whether the OS breakdowns occur thereon. In response to the access command, the data nodes return their examination results to the cluster manager, and thereby the cluster manager determines and records a list of broken data nodes.

Then, the cluster manager triggers a cluster tabulation image updating request to capture an up-to-date operational cluster tabulation image. The cluster manager requests OS and job application information and state information from data nodes and cluster job instances. In response to the request from the cluster manager, the data nodes and the cluster job instances return OS and job application tabulations to the cluster manager. Then, the cluster manager collects file system tabulations from shared nothing file system (FS) instances, which in response to the request of the cluster manager return FS conversion tabulations to the cluster manager.

The cluster manager aggregates the collected conversion tabulations to generate a newest cluster tabulation image, including a minimal operative OS and minimal operative applications of the data nodes. The newest cluster tabulation image and the current cluster tabulation image stored in the cluster manager are compared in terms of their appearances and behaviors, to find inconsistencies therebetween. If they are consistent, the cluster tabulation image currently stored in the cluster manager is kept unchanged; otherwise if they are inconsistent, the currently stored tabulation image is updated to keep consistent with the newest tabulation image, in addition to recording the updating event into a log on the cluster manager.

After that, the cluster manager distributes the newest cluster tabulation image to the data nodes in the list of faulted data nodes obtained previously to install the minimal operative OS in parallel in the memory of the data nodes, and return OS installation state information to the cluster manager after the completion of their installation. After receiving information representing the completion of the OS installation, the cluster manager indicates the data nodes to initiate cluster applications and/or local applications in parallel in the memory of the data nodes, after which the data nodes return application initiation state information to the cluster manager.

Up to this point, the cluster manager completes the recovery process of faulted data nodes in the cluster. As described above, all of the above operations illustrated in FIG. 5 can be completed in a time of seconds. Various data stored on the data nodes can be reused immediately, and the recovered data nodes can be still recognized by the operating cluster.

Figure 6:
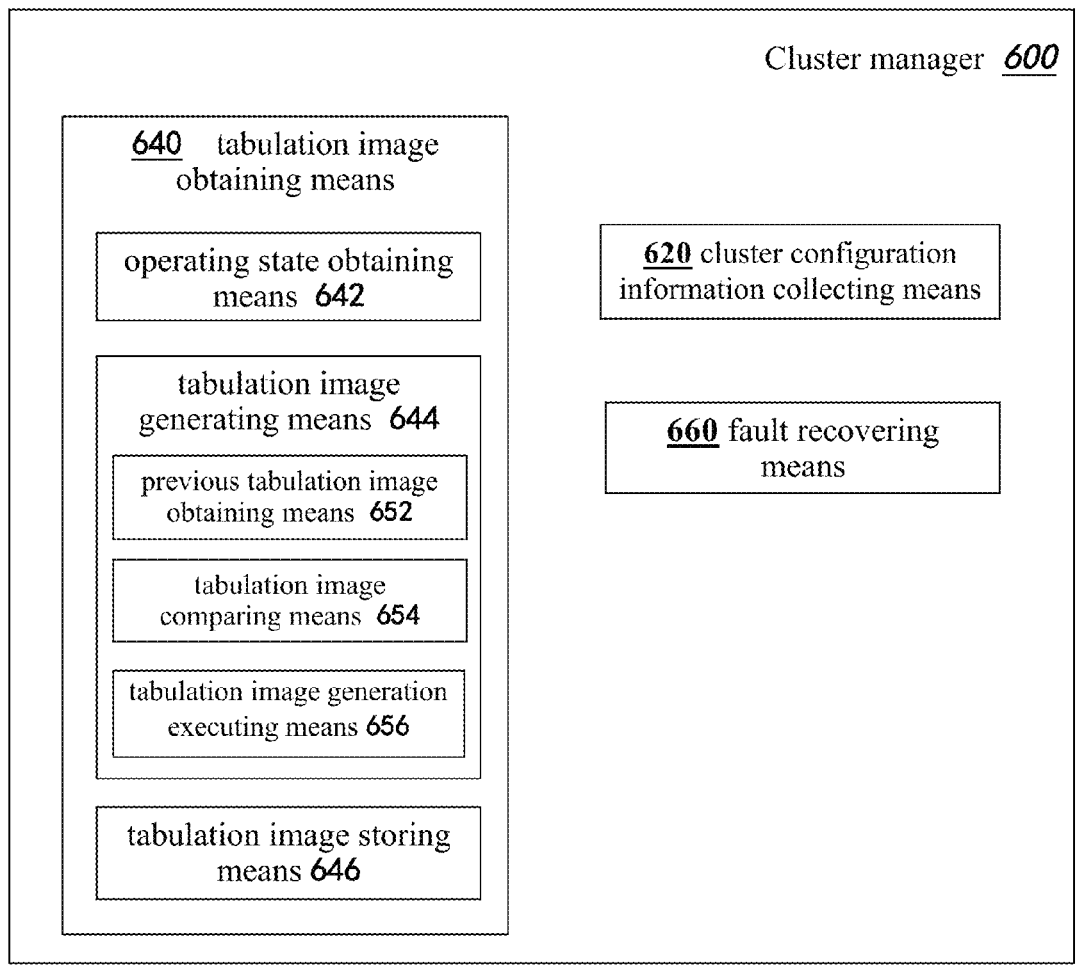
FIG. 6 schematically shows a functional block diagram of the cluster manager according to an embodiment of this invention.
Figure 7A:
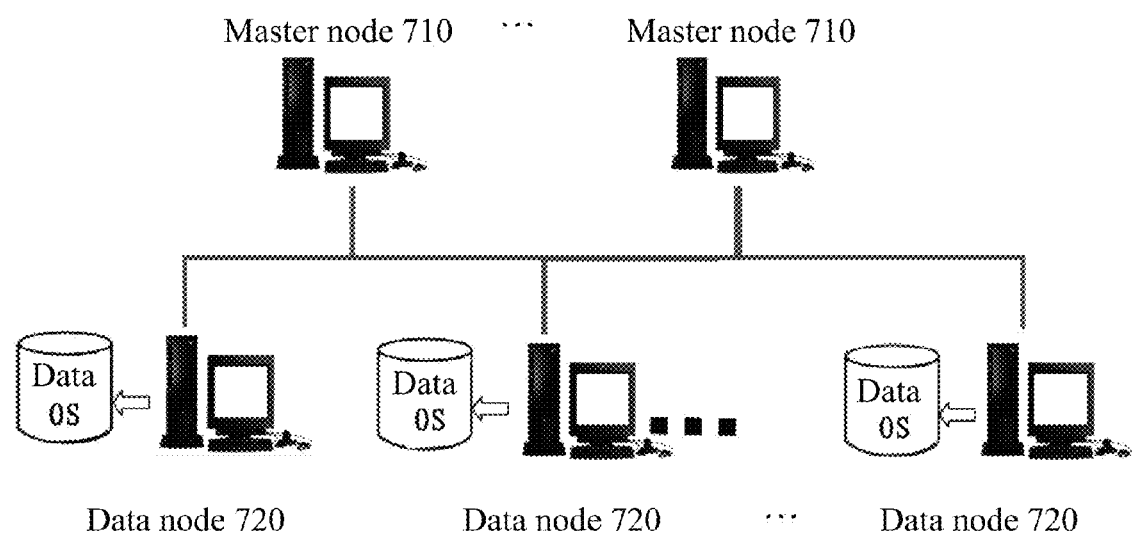
FIG. 7A and FIG. 7B show the architecture of an existing typical shared nothing cluster.
Figure 7B:
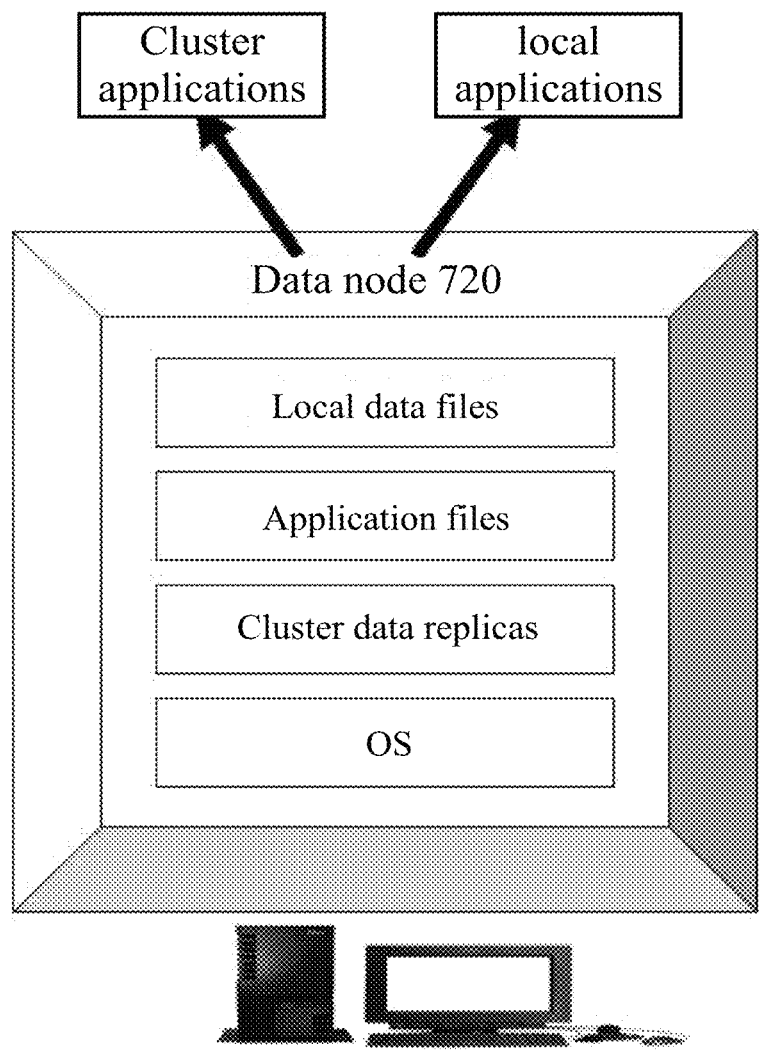

FIG. 6 shows a functional block diagram of a cluster manager 600 used in a shared nothing cluster according to an embodiment of this invention. The functional modules of the cluster manager 600 can be realized by hardware, software and a combination thereof to implement the principle of this invention. Those skilled in the art may appreciate that the functional modules depicted in FIG. 6 can be combined or further divided into sub-modules to achieve the above principle of this invention. Therefore, any possible combinations, divisions or further restrictions of the functional modules described herein are supported by the description of this invention.

The cluster manager 600 can recover faulted data nodes in a shared nothing cluster without interrupting cluster applications or rebalancing cluster data. The shared nothing cluster may comprise one or more data nodes, each having an OS and applications running thereon. The shared nothing cluster may further comprise one or more master nodes, each for superintending one or more data nodes. The cluster manager 600 may further comprise cluster configuration information collecting means 620, tabulation image obtaining means 640, and fault recovering means 660.

The cluster configuration information collecting means 620 may be configured to collect cluster configuration information associated with data nodes. In an example, the cluster configuration information may comprise information about an OS running on the data nodes. In another example, the cluster configuration information may further comprise information about applications running on the data nodes. Further, the application running on the data nodes may comprise cluster applications and/or local applications. In an embodiment, the cluster configuration information collecting means 620 may comprise means configured to collect, from the master node, cluster configuration information of data nodes superintended by the master node.

The tabulation image obtaining means 640 may be configured to obtain a tabulation image based on the cluster configuration information collected by the cluster configuration information collecting means 620. In an embodiment, the tabulation image obtaining means 640 may comprise operating state obtaining means 642, tabulation image generating means 644 and tabulation image storing means 646.

The operating state obtaining means 642 may be configured to obtain cluster operating state information of the shared nothing cluster. The tabulation image generating means 644 may be configured to generate a tabulation image containing a minimal operative OS using the cluster operating state information obtained by the operating state obtaining means 642 and the cluster configuration information collected by the cluster configuration information collecting means 620. In an embodiment, the tabulation image generated by the tabulation image generating means 644 may further comprise minimal operative applications. The tabulation image storing means 646 may be configured to store the generated tabulation image.

In an example, the tabulation image generating means 644 may comprise previous tabulation image obtaining means 652, tabulation image comparing means 654, and tabulation image generation executing means 656. The previous tabulation image obtaining means 652 may be configured to obtain a previously stored tabulation image. The tabulation image comparing means 654 may be configured to compare the cluster operating state information obtained by the operating state obtaining means 642 and the cluster configuration information collected by the cluster configuration information collecting means 620 with the previously stored tabulation image obtained by the previous tabulation image obtaining means 652. The tabulation image generation executing means 656 may be configured to generate an up-to-date tabulation image containing a minimal operative OS based on the comparison result of the tabulation image comparing means 654.

The fault recovering means 660 may be configured to, in response to OS breakdowns occurred on one or more data nodes, send the tabulation image obtained by the tabulation image obtaining means 640 to the faulted data nodes to recover their OSs. In an embodiment, the fault recovering means 660 is further configured to in response to determining OS breakdowns occurred on multiple data nodes, install the minimal operative OS in parallel on the multiple data nodes. In an embodiment, the fault recovering means 660 is further configured to in response to installing the minimal operative OS on the multiple data nodes, install the minimal operative applications in parallel on the multiple data nodes. In an embodiment, at least one of the installations of the minimal operative OS and the minimal operative applications is performed in the memory of the data nodes.

In an embodiment, the data nodes contained in the shared nothing cluster may be divided into one or more data node groups, provided that all data nodes in each data node group have the same OS and applications running thereon. The tabulation image obtaining means 640 may comprise: means configured to, for each data node group, based on the cluster configuration information collected from data nodes of that group, obtain a tabulation image of that group. The fault recovering means 660 may comprise means configured to determine a data node group which a data node having a broken-down OS belongs to; and means configured to send a tabulation image corresponding to the data node group to the faulted data node.

The cluster management method and device of this invention can be incorporated with several existing shared nothing clusters, for example, directly installed at the cluster management layer. As an example, the cluster management method and device of this invention can be incorporated into the cluster management layer of the IBM's Big Data platform.

With the method and device of this invention, transparent OS/application failover is provided, in which faulted data nodes in a shared nothing cluster can be recovered without interrupting cluster applications or rebalancing cluster data, so that cluster performance can be improved.

With the method and device of this invention, the time, human effects and cost of OS/application installation can be reduced, so that data nodes can be rapidly recovered when faults occur, for example, in a few seconds. Further, recovery is realized through using a tabulation image containing a minimal operative OS, so that the complexity of OS components can be reduced, and the recovery process can be accelerated. Still further, OS installation can be performed in the memory of the data nodes instead of direct-attached disks, making the recovery process more conveniently.

With the method and device of this invention, replicated installation operations on multiple faulted data nodes can be eliminated, so that time and cost can be saved.

With the method and device of this invention, data stored on nodes can be reused almost immediately when OS breakdowns occur on data nodes without the loss of applications, so that the security of data nodes can be improved.

Thus, as described herein, one object of this invention is to rapidly and effectively recover a faulted data node in a shared nothing cluster, without interrupting cluster applications or rebalancing cluster data.

The cluster management method and device of this invention dynamically collect cluster configuration information, and obtain a tabulation image containing a minimal operative OS and minimal operative applications according to the collected cluster configuration information, then in response to determining an OS breakdown on one or more data nodes in the cluster, the obtained tabulation image is sent to the faulted data nodes to recover its OS and applications rapidly.

According to one embodiment of the present invention, there is provided a cluster management method used in a shared nothing cluster, wherein the shared nothing cluster comprises one or more data nodes each having an OS and applications running thereon, wherein none of the nodes share memory and/or data storage devices between/among themselves, and wherein the cluster management method comprises: collecting cluster configuration information associated with the data nodes; obtaining tabulation image based on the collected cluster configuration information; and in response to determining an OS breakdown occurred on one or more data nodes, sending the obtained tabulation image to the faulted data node to recover its OS.

In an embodiment, obtaining tabulation image comprises obtaining cluster operation state information of the shared nothing cluster; generating the tabulation image containing a minimal operative OS using the obtained cluster operation state information and the collected cluster configuration information; and storing the generated tabulation image. In an embodiment, the generated tabulation image may further comprise minimal operative applications.

In an embodiment, in response to determining OS breakdowns on multiple data nodes, the minimal operative OS is installed in parallel on the multiple data nodes. In an embodiment, in response to installing the minimal operative OS on the multiple data nodes, the minimal operative applications are installed in parallel on the multiple data nodes. In an embodiment, the installation of at least one of the minimal operative OS and the minimal operative applications is performed in the memory of the multiple data nodes.

According to a second aspect of the present invention, there is provided a cluster manager used in a shared nothing cluster, wherein the shared nothing cluster comprises one or more data nodes each having an OS and applications running thereon, the cluster manager comprises: a cluster configuration information collector, configured to collect cluster configuration information associated with the data nodes; a tabulation image obtaining device, configured to obtain tabulation image based on the collected cluster configuration information; and a fault recovery device, configured to in response to determining an OS breakdown occurred on one or more data nodes, send the tabulation image obtained by the tabulation image obtaining device to the faulted data node to recover its OS.

According to a third aspect of the present invention, there is provided a shared nothing cluster, comprising one or more data nodes, each of which having an OS and applications running thereon; one or more master nodes each for superintending one or more of the data nodes; and a cluster manager according to the second aspect of this invention, configured to handle faults of the OS or applications running on the data node.

With the method and device of this invention, transparent OS/application failover is provided, in which faulted data nodes in the shared nothing cluster can be recovered without interrupting cluster applications or rebalancing cluster data, so that cluster performance can be improved.

With the method and device of this invention, the time, human efforts, and cost required to install OS/application can be saved, so that a faulted data node can be recovered rapidly, for example in a few seconds. Furthermore, the recovery is realized through adopting a tabulation image containing a minimal operative OS, so that the complexity of OS components can be lowered, and the recovery process can be accelerated. Furthermore, OS installation can be performed in the memory of the data node, instead of a direct-attached disk, leading to an agile recovery process.

With the method and device of this invention, replicated installation operations on multiple faulted data nodes are eliminated, so that time and cost can be saved.

With the method and device of this invention, data stored on a node can be almost immediately reused when the OS of the data node breaks down without losing any application, so that the security of the data node can be improved.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of cluster management in a shared nothing cluster, wherein the shared nothing cluster comprises one or more data nodes each having an operating system and applications running thereon, wherein the data nodes in the shared nothing cluster do not share data storage devices, and wherein the method comprises:
   collecting, by a cluster manager, cluster configuration information associated with the data nodes in the shared nothing cluster, wherein the data nodes do not share access to data storage devices, wherein the cluster manager is configured to handle operating system and application faults in the data nodes according to configuration information about the data nodes in a shared nothing cluster, wherein the configuration information is collected by a master node in the shared nothing cluster, wherein the configuration information describes an operating system and applications running in the master node and multiple data nodes within the shared nothing cluster, and wherein the master node superintends the multiple data nodes;
   obtaining, by the cluster manager, a tabulation image based on the collected cluster configuration information; and
   in response to determining that operating system breakdowns occurred on one or more of the data nodes, sending, by the cluster manager, the obtained tabulation image to faulted data nodes to recover their operating systems.

2. The method according to claim 1, wherein the cluster configuration information comprises information about operating systems running on the data nodes.

3. The method according to claim 2, wherein the cluster configuration information further comprises information about the applications running on the data nodes, wherein the applications comprise at least one of cluster applications and local applications.

4. The method according to claim 1, wherein obtaining the tabulation image comprises:
   obtaining, by the cluster manager, cluster operating state information of the shared nothing cluster;
   using the obtained cluster operating state information and the collected cluster configuration information, generating, by the cluster manager, a tabulation image containing a minimal operative operating system without a full operating system, wherein the minimal operative operating system is an operating system kernel;
   storing, by the cluster manager, the generated tabulation image; and
   transmitting, from the cluster manager, the generated tabulation image with only the operating system kernel to the multiple data nodes.

5. The method according to claim 4, wherein said sending the obtained tabulation image to the faulted data nodes to recover their operating systems comprises:
   in response to determining that operating system breakdowns occurred on multiple data nodes, installing the minimal operative operating system without the full operating system in parallel on the multiple data nodes.

6. The method according to claim 4, wherein the tabulation image further comprises minimal operative applications, and wherein in response to determining that operating system breakdowns occurred on one or more of the data nodes, said sending the obtained tabulation image to the faulted data nodes to recover their operating systems further comprises:

in response to installing the minimal operative operating system on the multiple data nodes, installing the minimal operative applications in parallel on the multiple data nodes.

7. The method according to claim 6, wherein at least one of the installation of the minimal operative operating system and the installation of the minimal operative applications is performed in the memory of the data nodes instead of direct-attached disks of the data nodes.

8. The method according to claim 4, wherein generating the tabulation image containing the minimal operative operating system comprises:
obtaining a previously stored tabulation image;
comparing the obtained cluster operating state information and the collected cluster configuration information with the previously stored tabulation image to generate a comparison result; and
based on the comparison result, generating an up-to-date tabulation image containing the minimal operative operating system.

9. The method according to claim 8, further comprising:
distributing the up-to-data tabulation image from the cluster manager to data nodes in a list of faulted data nodes in the shared nothing cluster.

10. The method according to claim 1, wherein the data nodes contained in the shared nothing cluster are divided into one or more data node groups, wherein all data nodes in each of the data node groups have a same operating system and applications running thereon, and wherein said obtaining the tabulation image comprises:
for each group from the data node groups, obtaining a tabulation image of the group based on cluster configuration information collected from data nodes contained in the group; and wherein said sending the obtained tabulation image to the faulted data nodes comprises:
determining a data node group which a faulted data node having broken-down operating system belongs to; and
sending a tabulation image, corresponding to the data node group, to the faulted data node.

11. A computer program product for cluster management of a shared nothing cluster, wherein the shared nothing cluster comprises one or more data nodes each having an operating system and applications running thereon, wherein the data nodes in the shared nothing cluster do not share data storage devices, wherein the computer program product comprises a non-transitory computer readable storage medium having program code embodied therewith, the program code readable and executable by a processor to perform a method comprising:
collecting cluster configuration information associated with the data nodes, wherein a cluster manager is configured to handle operating system and application faults in the data nodes according to configuration information about the data nodes in a shared nothing cluster, wherein the configuration information is collected by a master node in the shared nothing cluster, wherein the configuration information describes an operating system and applications running in the master node and multiple data nodes within the shared nothing cluster, and wherein the master node superintends the multiple data nodes;
obtaining a tabulation image based on the collected cluster configuration information; and
in response to determining that operating system breakdowns occurred on one or more of the data nodes, sending the obtained tabulation image to faulted data nodes to recover their operating systems.

12. The computer program product of claim 11, wherein the cluster configuration information comprises information about operating systems running on the data nodes.

13. The computer program product according to claim 12, wherein the cluster configuration information further comprises information about the applications running on the data nodes, wherein the applications comprise at least one of cluster applications and local applications.

14. The computer program product according to claim 11, wherein obtaining the tabulation image comprises:
obtaining cluster operating state information of the shared nothing cluster;
using the obtained cluster operating state information and the collected cluster configuration information, generating a tabulation image containing a minimal operative operating system; and
storing the generated tabulation image.

15. The computer program product according to claim 14, wherein said sending the obtained tabulation image to the faulted data nodes to recover their operating systems comprises:
in response to determining that operating system breakdowns occurred on multiple data nodes, installing the minimal operative operating system in parallel on the multiple data nodes.

16. A computer system comprising:
a processor, a computer readable memory, and a computer readable storage medium;
first program instructions to collect cluster configuration information associated with the data nodes in a shared nothing cluster, wherein the shared nothing cluster comprises one or more data nodes each having an operating system and applications running thereon, and wherein the data nodes in the shared nothing cluster do not share data storage devices;
second program instructions to obtain a tabulation image based on the collected cluster configuration information; and
third program instructions to, in response to determining that operating system breakdowns occurred on one or more of the data nodes, send the obtained tabulation image to faulted data nodes to recover their operating systems; and wherein
the first, second, and third program instructions are stored on the computer readable storage medium, and wherein the first, second, and third program instructions are executed by the processor via the computer readable memory.

17. The computer system according to claim 16, wherein the cluster configuration information comprises information about operating systems running on the data nodes.

18. The computer system according to claim 17, wherein the cluster configuration information further comprises information about the applications running on the data nodes, wherein the applications comprise at least one of cluster applications and local applications.

19. The computer system according to claim 16, wherein said second program instructions to obtain the tabulation image further comprise instructions to:
obtain cluster operating state information of the shared nothing cluster;
use the obtained cluster operating state information and the collected cluster configuration information, generating a tabulation image containing a minimal operative operating system; and
store the generated tabulation image.

20. The computer system according to claim 19, wherein said third program instructions to send the obtained tabulation image to the faulted data nodes to recover their operating systems further comprises instructions to:
    in response to determining that operating system breakdowns occurred on multiple data nodes, install the minimal operative operating system in parallel on the multiple data nodes.

* * * * *